US009169110B2

(12) United States Patent
Gerdes et al.

(10) Patent No.: US 9,169,110 B2
(45) Date of Patent: Oct. 27, 2015

(54) METHOD FOR DETERMINING THE PROBABILITY OF A HANDLING TRUCK'S TIPPING OVER

(75) Inventors: Manfred Gerdes, Vaihingen Enz (DE); Stefan Otterbein, Stuttgart (DE); Ralf Becker, Schwieberdingen (DE); Christian Schmidt, Stuttgart (DE); Martin Gustmann, Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 13/701,386

(22) PCT Filed: Jun. 8, 2011

(86) PCT No.: PCT/EP2011/002804

§ 371 (c)(1), (2), (4) Date: Apr. 15, 2013

(87) PCT Pub. No.: WO2011/154129

PCT Pub. Date: Dec. 15, 2011

(65) Prior Publication Data

US 2013/0211679 A1 Aug. 15, 2013

(30) Foreign Application Priority Data

Jun. 8, 2010 (DE) ......................... 10 2010 023 069

(51) Int. Cl.

| | |
|---|---|
| ***B66F 9/06*** | (2006.01) |
| ***G05B 19/37*** | (2006.01) |
| ***B66F 9/075*** | (2006.01) |
| ***B66F 17/00*** | (2006.01) |

(52) U.S. Cl.

CPC ........... *B66F 9/07559* (2013.01); *B66F 17/003* (2013.01)

(58) Field of Classification Search

USPC ............................................................ 701/50

See application file for complete search history.

(56) References Cited

U.S. PATENT DOCUMENTS

| | | | | |
|---|---|---|---|---|
| 3,100,548 A | 8/1963 | Ulinski | | |
| 7,216,024 B1 * | 5/2007 | Abels et al. | ..................... | 701/50 |
| 2010/0250073 A1 * | 9/2010 | McCabe et al. | ................. | 701/50 |

FOREIGN PATENT DOCUMENTS

| | | | |
|---|---|---|---|
| CN | 101407307 | A | 4/2009 |
| DE | 100 10 011 | A1 | 2/2001 |
| DE | 103 04 658 | A1 | 8/2004 |
| EP | 2 233 427 | A1 | 9/2010 |
| GB | 1 258 081 | A | 12/1971 |
| JP | 4-271211 | A | 9/1992 |
| JP | 9-309465 | A | 12/1997 |
| JP | 11-334635 | A | 12/1999 |
| JP | 2001-63991 | A | 3/2001 |
| JP | 2001-206695 | A | 7/2001 |
| WO | 2009/130528 | A1 | 10/2009 |

OTHER PUBLICATIONS

International Search Report corresponding to PCT Application No. PCT/EP2011/002804, mailed Nov. 23, 2011 (German and English language document) (7 pages).

* cited by examiner

*Primary Examiner* — Adam Tissot

(74) *Attorney, Agent, or Firm* — Maginot, Moore & Beck LLP

(57) ABSTRACT

A method for determining the probability a handling truck tipping over includes determining a respective normal force acting in the z direction for at least two of at least three wheels of the handling truck. At least two normal forces are compared and the probability of the tipping of the handling truck is determined on the basis of the comparison.

15 Claims, 2 Drawing Sheets

METHOD FOR DETERMINING THE PROBABILITY OF A HANDLING TRUCK'S TIPPING OVER

This application is a 35 U.S.C. §371 National Stage Application of PCT/EP2011/002804, filed on Jun. 8, 2011, which claims the benefit of priority to Serial No. DE 10 2010 023 069.3, filed on Jun. 8, 2010 in Germany, the disclosures of which are incorporated herein by reference in their entirety.

BACKGROUND

The present disclosure relates to a method for determining a probability of tipping in the case of an industrial truck, such as, for example, a fork-lift truck.

Fork-lift trucks (known as FLTs) from different manufacturers are of very similar design in terms of the chassis. A front axle drive with a front axle which is permanently mounted on the body, a rear axle steering system with a pendulum axle and virtually complete elimination of a suspension system (only the tire has elastic properties) are predominant. The steering system is usually embodied as a hydrostatic steering system, i.e. the steering wheel angle is transferred to the wheel steering angle via hydraulic connection elements. The lift mast with the load fork is mounted in from of the front axle, and the driver is seated between the axles. The drive of the fork-lift truck generates both the driving torques and the braking torques via the drive train. A service brake which acts on all four wheels is usually not provided.

Fork-lift trucks are very compact, i.e. narrow and short, in design, very maneuverable and can lift large loads to a great height. In this context, there is, under certain circumstances, a high risk of tipping over during the taking up of the load, during driving and in particular on roadways which have an incline since the loads on the fork shift the entire center of gravity of the fork-lift truck to a great extent, and, under certain circumstances, very greatly reduce the static and dynamic tipping stability of the fork-lift truck during travel, which cannot always be predicted by the driver.

Within the scope of this disclosure, subsequent terms and definitions are used:

The x axis points in the direction of travel, and the y axis points perpendicularly thereto to the right along the front axle. The z axis is perpendicular to the x-y plane and points downward. (right-handed system). The rotation about the x axis (longitudinal axis) is referred to as rolling, the rotation about the y axis (transverse axis) as pitching and the rotation about the z axis (vertical axis/yaw axis) as yawing.

DE 103 04 658 A1, to which reference is expressly made for details regarding the stability model on which a fork-lift truck is based, discloses a device for controlling the driving stability of an industrial truck and a method for actuating an industrial truck. The load, the inclination of the mast and the lifting frame, the lifting height of the load, the tipping forces acting on the mast and the accelerations acting in the longitudinal direction and transverse direction on the vehicle are detected by means of a sensor system and compared with predefined limiting values. These limiting values which are dependent on the driving state cannot be arbitrarily exceeded by the driver, with the result that the vehicle generally remains stable irrespective of the driving state (cornering, straight-ahead travel, downhill travel . . . ).

It is desirable to specify an improved method for determining a probability of tipping in order then, if appropriate, to able to react more quickly in order to prevent tipping.

SUMMARY

According to the disclosure, a method for determining a probability of tipping of an industrial truck is proposed. Advantageous refinements are the subject matter of the dependent claims and of the following description.

The disclosure can selectively improve the determination of the risk of tipping in industrial trucks by virtue of the fact that a tipping evaluation which is defined on an axle basis and/or side basis is carried out. In this context, the normal forces which act on the wheels are compared, wherein preferably probabilities of rolling and of pitching are determined as probabilities of tipping on the basis of the normal forces. The determination is based, in particular, on the forces in the z direction (normal forces), in the case of a four-wheel device, for example, on $F_{ZVR}$, $F_{ZVL}$ (normal force front right or left) and $F_{ZHR}$, $F_{ZHL}$ (normal force rear right or left). In the dependent claims, inter alia preferred equations are specified in order to determine specific probabilities of rolling and of pitching. These equations are distinguished by their particularly simple form and nevertheless produce very usable tipping evaluations.

In a further preferred refinement, an intervention which counteracts the tipping is carried out automatically in reaction to the determined probability of tipping. Setpoint accelerations in the x and y directions of the industrial truck are expediently determined in order to reduce or eliminate the risk of tipping. As a result, the operational reliability can be significantly increased. Damage to man and/or machine is avoided. In one refinement, limiting values for the lifting mast drive can be predefined in order to prevent inadmissible fork heights and angles of inclination of the lifting mast. The velocity can also be limited as an intervention.

Further advantages and refinements of the disclosure can be found in the description and the appended drawing.

Of course, the features which are mentioned above and those which are still to be explained below can be used not only in the respectively specified combination but also in other combinations or alone without departing from the scope of the present disclosure.

BRIEF DESCRIPTION OF THE DRAWINGS

The disclosure is illustrated schematically in the drawings with reference to exemplary embodiments and is described in detail below with reference to the drawings.

DETAILED DESCRIPTION

Although the disclosure is explained below with reference to a counterweight fork-lift truck, this is purely by way of example. It is to be noted that the described models can also be applied to other industrial trucks in order to implement the disclosure.

Figure 1:
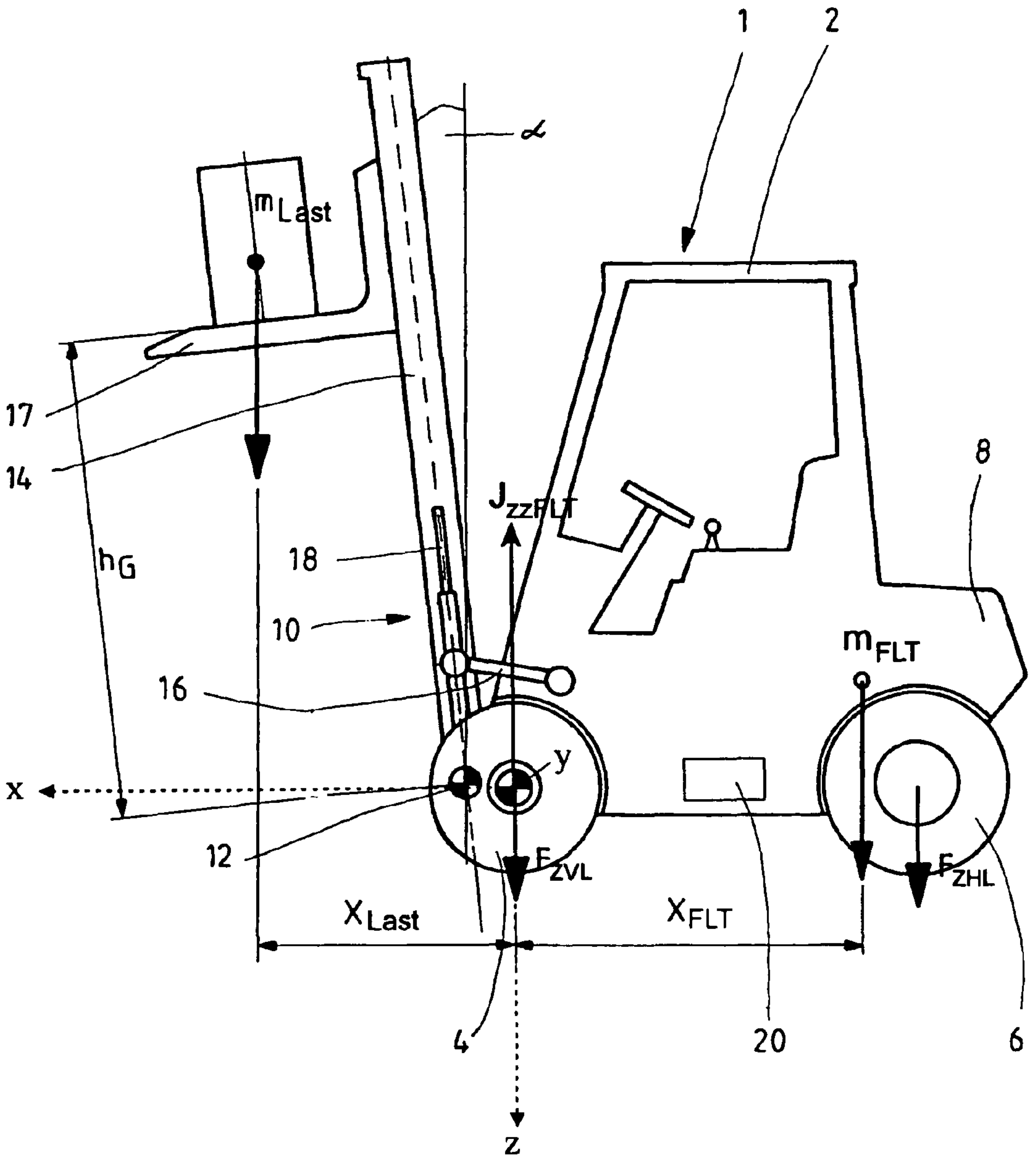
FIG. 1 shows a schematic illustration of a counterweight fork-lift truck in a side view.

FIG. 1 shows a schematic side view of a counterweight fork-lift truck 1 (also referred to as FLT below) with a driver's cab 2, a chassis with a front axle 4, a steerable rear axle 6, for example at pendulum axle, and a counterweight 8 arranged in the region of the rear axle 6. It is assumed, without restriction, below that the origin of the coordinates lies in the center of the front axle, wherein the resulting coordinate axes x, y and z are shown in FIG. 1.

A lifting frame 10 with a mast 14 which can tip about an axis 12 of inclination is mounted on the front side of the fork-lift truck. The setting of the angle a of inclination of the mast 14 is carried out by means of an inclination device with, for example, two inclination cylinders 16 which are attached in an articulated fashion to the vehicle frame and to the mast 14. A fork 17 is displaceably guided on the frame-shaped mast, wherein the lifting height $h_G$ can be set by means of a schematically indicated lifting cylinder 18. The FLT 1 also comprises a control unit 20 which can be integrated into the vehicle controller or embodied as an external module. The control unit 20 is configured for carrying out the disclosure.

In the text which follows, estimations which can be carried out easily, and which can serve as a starting point for the following description, are firstly explained. For further details relating to the determination of various variables in a fork-lift truck, reference is made expressly to DE 103 04 658 A1.

It is proposed to measure the state of movement of the fork-lift truck in every direction of the space using, for example, what is referred to as a sensor cube with yaw rate sensors and acceleration sensors, with the result that a quasi-static movement trajectory of the fork-lift truck on the driving plane (xy) can be separated from the dynamic signal components of the movement which are caused by steering influences and drive influences. As a result, the inclination of the roadway in the longitudinal direction and transverse direction can be estimated. These estimated values can be advantageously used for the model calculations described further below.

The position ($x_{FLT}$, $y_{FLT}$, $z_{FLT}$) of the center of gravity of the fork-lift truck can be determined from the measurement of the empty fork-lift truck. For example, for this purpose it is possible to use oblique planes and weighing cells for determining the axle load, i.e. such a determination can be carried out with relatively little expenditure under certain circumstances. As a result, the fork-lift truck can be considered to be a point mass $m_{FLT}$. Furthermore, the moment of inertia of the fork-lift truck about the vertical axis $J_{zzFLT}$ can be measured and therefore presumed to be known.

The fork load $m_{load}$ and the position of the center of gravity of the fork load can, as described above, be estimated or determined, for example, according to DE 103 04 658 A1. This result in a fork-lift truck total model with two masses with two centers of gravity which can be combined to form a total mass $m_{total}$ a total center of gravity position and a total moment of inertia.

The total mass $m_{total}$ is determined as:

$$m_{total}=m_{load}+m_{FLT}.$$

The x center of gravity distance from the front axle $x_{total}$ is determined as:

$$x_{total}=(m_{FLT}\cdot x_{FLT}-m_{load}\cdot x_{load})/m_{total}.$$

The vertical distance between the total center of gravity $z_{total}$ and the origin is determined as:

$$z_{total}=(m_{FLT}\cdot z_{FLT}+m_{Load}\cdot z_{load})/m_{total}.$$

The total moment of inertia $J_{zztotal}$ of the fork-lift truck about the vertical axis is determined as:

$$J_{zztotal}=J_{zzFLT}+m_{Load}\cdot x_{load}^2.$$

As a result, the normal forces at each wheel can be estimated, for example, from sensor signals and by means of the computational model which is explained by way of example below:

A fork-lift truck generally has no separately embodied suspension system, i.e. the rear pendulum axle is coupled without suspension to the fork-lift truck body and the front wheels of the fork-lift truck are mounted directly and rigidly on the body. As a result, the fork-lift truck body is mechanically secured at three points, that is to say to the front wheels and to the joint at the pendulum axle. If rolling angles and pitching angles of the fork-lift truck are then measured, the angles of inclination of the roadway are estimated in the se directions and the yaw rate $v_{Gi}$, the transverse acceleration $a_y$ and the longitudinal acceleration $a_x$ are measured, the normal forces at the front wheels $F_{ZVL}$ and $F_{ZVR}$ can be determined from the sums of the forces and moments of the fork-lift truck body, as can the transverse force $F_{QH}$ and normal force $F_{ZH}$ in the joint of the pendulum axle:

$$(F_{ZVL}+F_{ZVR})=[m\cdot g\cdot(I_H\cdot\cos(\psi_P+\psi)+h_S\cdot\sin(\psi_P+\psi))+m\cdot a_x\cdot h_S\cdot J_{yy}\cdot\partial^2\psi/\partial t^2]/(I_V+I_H);$$

$$(F_{ZVL}-F_{ZVR})=\{m\cdot[a_y\cdot\cos(\phi_R+\phi)+g\cdot\sin(\phi_R+\phi)]+J_{xx}\cdot\partial^2\phi/\partial t^2-F_{QH}\cdot(1-h_P/h_S)\}\cdot 2\cdot h_S/s_{wV};$$

$$F_{QH}=\{J_{zz}\cdot\partial v_{Gi}/\partial I+m\cdot I_V-[a_y\cdot\cos(\phi_R+\phi)+g\cdot\sin(\phi_R+\phi)]\}/(I_H+I_V);$$

$$F_{ZH}=m\cdot g\cdot\cos(\phi_R+\phi)\cdot\cos(\psi_P+\psi)-m\cdot a_y\cdot\sin(\phi_R+\phi)-(F_{ZVR}+F_{ZVL});$$

The normal forces at the front wheels are obtained as:

$$F_{ZVR}=\tfrac{1}{2}[(F_{ZVL}+F_{ZVR})-(F_{ZVL}-F_{ZVR})]$$

$$F_{ZVL}=[(F_{ZVL}+F_{ZVR})-F_{ZVR}]$$

The normal forces at the rear wheels $F_{ZHL}$ and $F_{ZHR}$ are obtained as:

$$F_{ZHL}=F_{QH}\cdot h_{PG}/s_{wH}+F_{ZH}/2$$

$$F_{ZVL}=[(F_{ZVL}+F_{ZVR})-F_{ZVR}]$$

Parameters:

m: Total mass of fork-lift truck in [kg]
g: Acceleration due to gravity [$m/s^2$]
$I_H$: Longitudinal distance of rear axle from center of gravity [m]
$I_V$: Longitudinal distance of front axle from center of gravity [m]
$a_x$: Longitudinal acceleration [$m/s^2$]
$h_S$: Height of center of gravity above ground [m]
$h_P$: Height of center of gravity above joint of pendulum axle [m]
$h_{PG}$: Height of joint of pendulum axle above ground [m]
$S_{wV}$: Wheel gage at the front [m]
$S_{wH}$: Wheel gage at the rear [m]
$J_{yy}$: Moment of inertia in pitching direction [$kgm^2$]
$J_{xx}$: Moment of inertia in rolling direction [$kgm^2$]
$\phi_R$: Rolling angle [rad]
$\phi$: Inclination of roadway in rolling direction [rad]
$\psi_P$: Pitching angle [rad]
$\psi$: Inclination of roadway in pitching direction [rad]
$V_{Gi}$: Yaw rate This is a preferred possible way of determining the normal forces at the wheels. Of course, the normal forces can in principle also be determined in other ways, for example by using reductions or extensions of the above equations.

According to the disclosure it has been detected that fork-lift trucks tend to tip early on one axle while the other remains on the floor. The probability of tipping, here the probability of pitching, is therefore expediently determined on an axle basis, for example as $R_{QVA}$ for the front axle and $R_{QHA}$ for the rear axle, according to the following preferred relationship:

$$R_{QVA}=(F_{ZVR}-F_{ZVL})/(F_{ZVR}+F_{ZVL})$$

$$R_{QHA}=(F_{ZHR}-F_{ZHL})/(F_{ZHR}+F_{ZHL}).$$

In the longitudinal direction, a similar evaluation of the probability of tipping, here the probability of rolling, can take place. Consideration is given here to evaluating the left-hand fork-lift truck side with a probability $R_{LL}$ of rolling separately from the right-hand side with a probability $R_{LR}$ of rolling:

$$R_{LL}=(F_{ZVL}-F_{ZHL})/(F_{ZVL}+F_{ZHL})$$

$$R_{LR}=(F_{ZVR}-F_{ZHR})/(F_{ZVR}+F_{ZHR}).$$

Consideration is also given to determining a total probability $R_L$ of rolling:

$$R_L=(F_{ZVL}+F_{ZVR}-F_{ZHL}-F_{ZHR})/(F_{ZVL}+F_{ZVR}+F_{ZHL}+F_{ZHR})$$

If one of the determined probabilities of tipping reaches a value near to an absolute value of 1, only a very small normal force still acts on at least one wheel, so that it is recognised that the fork-lift with the result that it is detected that the fork-lift truck is threatening to tip. If the absolute value of the specific probability of tipping is near to zero, there is no risk of tipping.

In one preferred development, an intervention which counteracts the tipping is carried out automatically. For example, the need for corrective intervention can be derived from the absolute values for the risk of tipping near to 1. A value of, for example, $R_{QMaX}=0.9$ can be used as a threshold value. It is also advantageous here to include the period of time in which such values are observed in the definition of the start of intervention, for example via suitable filter algorithms, with the result that high risks of tipping have to be determined over a defined time period in order to trigger a start of intervention.

A time dependence is expediently also included in the condition for the end of the control, in order to prevent early switching off of the intervention. Otherwise, owing to fluctuating switch-on and switch-off conditions it is possible for the oscillation of the fork-lift truck to increase with a high probability of tipping over. Furthermore, it is possible to set the switch-off threshold for interventions lower (for example at 0.8) than the switch-on threshold (for example at 0.9).

The equations cited above can be resolved, for example, according to a target variable, here for example a maximum permissible transverse acceleration $a_{yLimVA}$ and, respectively, $a_{yLimHA}$. For this purpose, desired values $R_{QVALim}$ and, respectively, $R_{QHALim}$ are predefined, for example as fixed variables or as variables which vary over time with sliding adaptation to the actual value:

$$a_{yLimVA} = \{[R_{QVALim} \cdot s_{wv} \cdot 1/2 \cdot \{g \cdot (I_H \cdot \cos(\psi_P + \psi) + h_S \cdot \sin(\psi_P + \psi)) + +a_x \cdot h_S - J_{yy}/m \cdot \partial^2 \psi/\partial t^2\} + +J_{zz}/m \cdot (h_S \cdot h_P) \cdot \partial v_{Gi}/\partial t - J_{xx}/m \cdot h_S \cdot (I_V + I_H) \cdot \partial^2 \varphi/\partial t^2]/(h_S \cdot I_H + I_V \cdot h_P) - -g \cdot \sin(\varphi_R + \varphi)\} // \cos(\varphi_R + \varphi).$$

$$a_{yLimHA} = [R_{QHALim} \cdot s_{wH} \cdot \{g \cdot [\cos(\psi_P + \psi) \cdot ((I_v + I_H) \cdot \cos(\varphi_R + \varphi) - I_H) - h_s \cdot \sin(\psi_P + \psi)] - -a_x \cdot h_s + J_{yy}/m \cdot \partial^2 \psi/\partial t^2\}] - \{J_{zz}/m \cdot \partial v_{Gi}/\partial t + I_v \cdot g \cdot \sin(\varphi_R + \varphi)\} \cdot h_{PG} \cdot 2] // [I_V \cdot h_{PG} \cdot 2 \cdot \cos(\varphi_R + \varphi) + R_{QHALim} \cdot s_{wH} \cdot (I_V + I_H) \cdot \sin(\varphi_R + \varphi)]$$

In one preferred refinement, the smaller of the transverse acceleration values is selected and used for the formation of limiting values:

$$a_{yLim}=\min\{a_{yLimVA}, a_{yLimHA}\}.$$

In a further preferred refinement, the transverse acceleration is now controlled, for example by means of steering interventions and/or drive interventions, in such a way that the determined limiting value is not exceeded.

According to the disclosure it has been determined that the effectiveness of a transverse acceleration control can be improved. For example, the dynamic behavior of the fork-lift truck when travelling forward results in poor controllability of the transverse acceleration, i.e. the boosting factors which are selected for the transverse acceleration control circuit cannot be very large. Therefore, in a preferred refinement a second control circuit is established by means of the yaw rate $v_{Gi}$ of the fork-lift truck. In this context, the function of generating quasi-steady-state movement behavior of the fork-lift truck in a boosted fashion in the sense of a subordinate control circuit is transferred to the yaw rate control circuit. As a result, under the assumption that the attitude angle gradient of the fork-lift truck is to be selected to be small the setpoint value $v_{GiSo}$ of the yaw rate control will become:

$$V_{GiSo}=a_{ySo}/v,$$

where v is the longitudinal speed of the fork-lift truck.

The control circuit via the yaw rate serves, in particular, additionally to apply dynamic components of the movement behavior.

Figure 2:
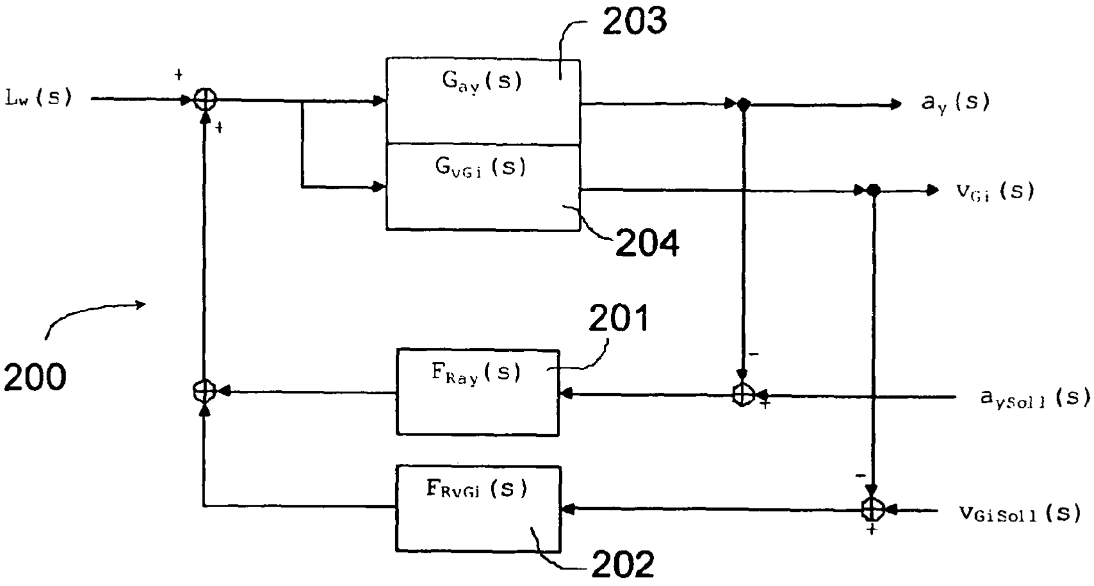
FIG. 2 shows an exemplary control circuit according to a preferred embodiment of the disclosure.

An exemplary control circuit is illustrated below with reference to FIG. 2. FIG. 2 is a schematic view of a control circuit structure 200 for controlling a transverse acceleration $a_y$ and a yaw rate $v_{Gi}$. For this purpose, corresponding setpoint values $a_{ySetp}$ and $v_{GiSetp}$ are fed as reference variables to the control circuit 200. The setpoint values are each fed to a comparison element to which the instantaneous actual values $a_y$ and $v_{Gi}$ are additionally fed as control variables. The comparison elements determine the respective control error.

The transverse acceleration control error is fed to a transverse acceleration control element 201 and the yaw rate error is fed to a yaw rate control element 202. The two control elements each determine a manipulated variable, for example a steering movement, which is summed and fed, after having a possible interference variable $L_w$ applied to it, to a transverse acceleration control section 203 and a yaw rate control section 204. The actual values $a_y$ and $v_{Gi}$ which are produced by means of the control sections are, as already mentioned, used as a control variable for comparison with the respective reference variable.

The statements previously made regarding the transverse acceleration $a_y$ apply in a correspondingly adapted fashion to the longitudinal acceleration $a_x$. In one refinement of the disclosure, a permissible longitudinal acceleration $a_{xLim}$ is determined from the inversion of the equation for the probability of pitching on the basis of the angle of inclination of the roadway, the load weight and the load center of gravity position and—for example by means of a drive intervention—the actual longitudinal acceleration is limited to this value.

If it is optionally detected that the lifting mast is in the non-lowered state, the velocity is expediently limited to low values. If it is detected in the load identification that there is a load on the fork which, given the existing (identified) inclination of the roadway, would lead to (static) tipping over of the fork-lift truck from a specific lifting height, the lifting height is expediently correspondingly limited. This can be done, for example, by limiting the connecting through of the operation control valves of the lifting mast with the result that the lifting mast cannot be moved to critical heights. Alternatively or additionally, the criticality of the load can be indicated to the driver at the driver's stand, for example visually or acoustically.

Figure 3:
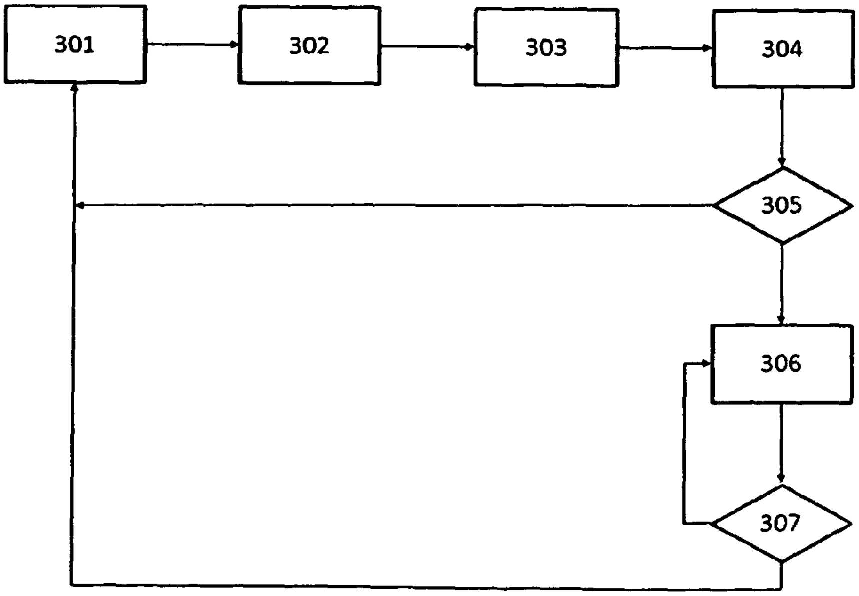
FIG. 3 shows a schematic view of the sequence of a preferred embodiment of the disclosure.

The sequence of a preferred embodiment of the disclosure is explained schematically with reference to FIG. 3. In a block 301, necessary parameters are determined, for example estimated or measured. These include the inclination of the roadway in the longitudinal direction and transverse direction, which inclination can be estimated, for example, from center of gravity signals. Furthermore, the fork load which has been picked up and the dimension of the fork load are determined, it being possible to estimate these on the basis of lifting mast signals, for example. On the basis of these variables and, in particular, further unchanging variables, the total center of gravity position of the loaded fork-lift truck is determined in a block 302.

In a block 303, the normal forces, which act on in each case one wheel, there being four here, are determined. In a block 304, various probabilities R of tipping, such as for example probabilities of rolling and probabilities of pitching, are determined on the basis of the normal forces, as explained above.

In a step 305, the determined probabilities of tipping are evaluated by comparing them, for example, with a predefined threshold value. It can also be taken into account here how long and by how much the respective probability of tipping exceeds a first threshold value. If it is determined during this evaluation that there is no risk of tipping over, the method returns to the starting point 301.

However, if it is determined that there is a risk of tipping over, in step 306 an intervention which counteracts the tipping is carried out automatically. This intervention may take the form of, in particular, controlling a transverse acceleration and/or longitudinal acceleration and/or a yaw rate, as explained above.

In a subsequent step 307 it is checked whether a predefined tipping over condition continues to be present by checking, for example, whether a specific probability of tipping has dropped below a second threshold value. The first and the second threshold values may, in particular, be different. If the tipping condition continues to be present, the intervention 306 continues to be carried out, but if the condition is no longer present, the system returns to the starting point 301. The assessment in step 307 also advantageously takes into account how long the second threshold value is undershot, in order to prevent increasing oscillation.

The invention claimed is:

1. A method for determining a probability of rolling of an industrial truck, comprising:

identifying with a control circuit in the industrial truck a first normal force that acts upon a right-front wheel on a front axle in a z-direction, a second normal force that acts upon a left-front wheel on the front axle in the z direction, a third normal force that acts upon a right-rear wheel on a rear axle in the z-direction, and a fourth normal force that acts upon a left-rear wheel on the rear axle in the z-direction with reference to signals from a plurality of acceleration sensors in the industrial truck;

identifying with the control circuit a first probability of the industrial truck rolling on the front axle with reference to a ratio of a difference of the first normal force and the second normal force to a sum of the of first normal force and the second normal force;

identifying with the control circuit a second probability of the industrial truck rolling on the rear axle with reference to a ratio of a difference of the third normal force and the fourth normal force to a sum of the of third normal force and the fourth normal force; and operating with the control circuit an intervention device in the industrial truck to prevent rolling in response to at least one of the first probability and the second probability exceeding a predetermined threshold.

2. The method of claim 1, the identification of the first, second, third, and fourth normal force further comprising;

identifying an angle of roll of the industrial truck and (ii) an inclination of a roadway that supports the industrial truck in an x direction and a y direction with reference to the signals from the plurality of acceleration sensors.

3. The method of claim 1, the identification of the first, second, third, and fourth normal force further comprising;

identifying a yaw rate, a lateral acceleration, and a longitudinal acceleration of the industrial truck with reference to the signals from the plurality of acceleration sensors.

4. The method of claim 1 further comprising:

operating with the control circuit the intervention device in response to at least one of the first probability and the second probability exceeding the predetermined threshold for longer than a predetermined time period.

5. The method of claim 1 further comprising;

controlling one or more of a transverse acceleration and a longitudinal acceleration of the industrial truck with the intervention device.

6. The method of claim 1, further comprising;

controlling a yaw rate of the industrial truck with the intervention device.

7. An industrial truck configured to identify tipping comprising:

a left-front wheel;

a right-front wheel;

a left-rear wheel;

a right-rear wheel;

a plurality of acceleration sensors;

an intervention device; and a control circuit operatively connected to the plurality of acceleration sensors and the intervention device, the control circuit being configured to:

identify a first normal force that acts upon the right-front wheel in a z-direction, a second normal force that acts upon the left-front wheel in the z direction, a third normal force that acts upon the right-rear wheel in the z-direction, and a fourth normal force that acts upon the left-rear wheel in the z-direction with reference to signals received from the plurality of acceleration sensors;

identify a first probability of the industrial truck pitching onto a right side with reference to a ratio of a difference of the first normal force and the third normal force to a sum of the of first normal force and the third normal force;

identify a second probability of the industrial truck pitching onto a left side with reference to a ratio of a difference of the second normal force and the fourth normal force to a sum of the of second normal force and the fourth normal force; and operate the intervention device in the industrial truck to prevent pitching in response to at least one of the first probability and the second probability exceeding a predetermined threshold.

8. A method for determining a probability of pitching of an industrial truck, comprising:

identifying with a control circuit in the industrial truck a first normal force that acts upon a right-front wheel in a z-direction, a second normal force that acts upon a left-front wheel in the z direction, a third normal force that acts upon a right-rear wheel in the z-direction, and a fourth normal force that acts upon a left-rear wheel in the z-direction with reference to signals received from a plurality of acceleration sensors in the industrial truck;

identifying with the control circuit a first probability of the industrial truck pitching onto a right side with reference to a ratio of a difference of the first normal force and the third normal force to a sum of the of first normal force and the third normal force;

identifying with the control circuit a second probability of the industrial truck pitching onto a left side with reference to a ratio of a difference of the second normal force and the fourth normal force to a sum of the of second normal force and the fourth normal force; and operating with the control circuit an intervention device in the industrial truck to prevent pitching in response to at least one of the first probability and the second probability exceeding a predetermined threshold.

9. The method of claim 8 further comprising:

identifying a third probability of pitching for the industrial truck with reference to a ratio of difference between a first sum of the first normal force and the second normal force and a second sum of the third normal force and the fourth normal force to a third sum of the first normal force, second normal force, third normal force and fourth normal force.

10. The method of claim 8, the identification of the first, second, third, and fourth normal force further comprising:

identifying an angle of pitch of the industrial truck and an inclination of a roadway that supports the industrial truck in an x direction and a y direction with reference to the signals from the plurality of acceleration sensors.

11. The method of claim 8, the identification of the first, second, third, and fourth normal force further comprising:

identifying a yaw rate, a lateral acceleration, and a longitudinal acceleration of the industrial truck with reference to the signals from the plurality of acceleration sensors.

12. The method of claim 8 further comprising:

operating with the control circuit the intervention device in response to at least one of the first probability and the second probability exceeding the predetermined threshold for longer than a predetermined time period.

13. The method of claim 8 further comprising:

controlling one or more of a transverse acceleration and a longitudinal acceleration of the industrial truck with the intervention device.

14. The method of claim 8 further comprising:

controlling a yaw rate of the industrial truck with the intervention device.

15. The industrial truck of claim 7 further comprising:

a front axle connected to the left-front wheel and the right-front wheel;

a rear axle connected to the left-rear wheel and the right-rear wheel; and the control circuit being further configured to:

identify a third probability of the industrial truck rolling on the front axle with reference to a ratio of a difference of the first normal force and the second normal force to a sum of the of first normal force and the second normal force;

identify a fourth probability of the industrial truck rolling on the rear axle with reference to a ratio of a difference of the third normal force and the fourth normal force to a sum of the of third normal force and the fourth normal force; and operate the intervention device in the industrial truck to prevent rolling in response to at least one of the third probability and the fourth probability exceeding a predetermined threshold.

* * * * *